Oct. 27, 1959 J. H. DOTTER ET AL 2,910,050
PISTON TYPE MULTIPORT FLUID PRESSURE VALVE
Filed June 13, 1955 3 Sheets-Sheet 1
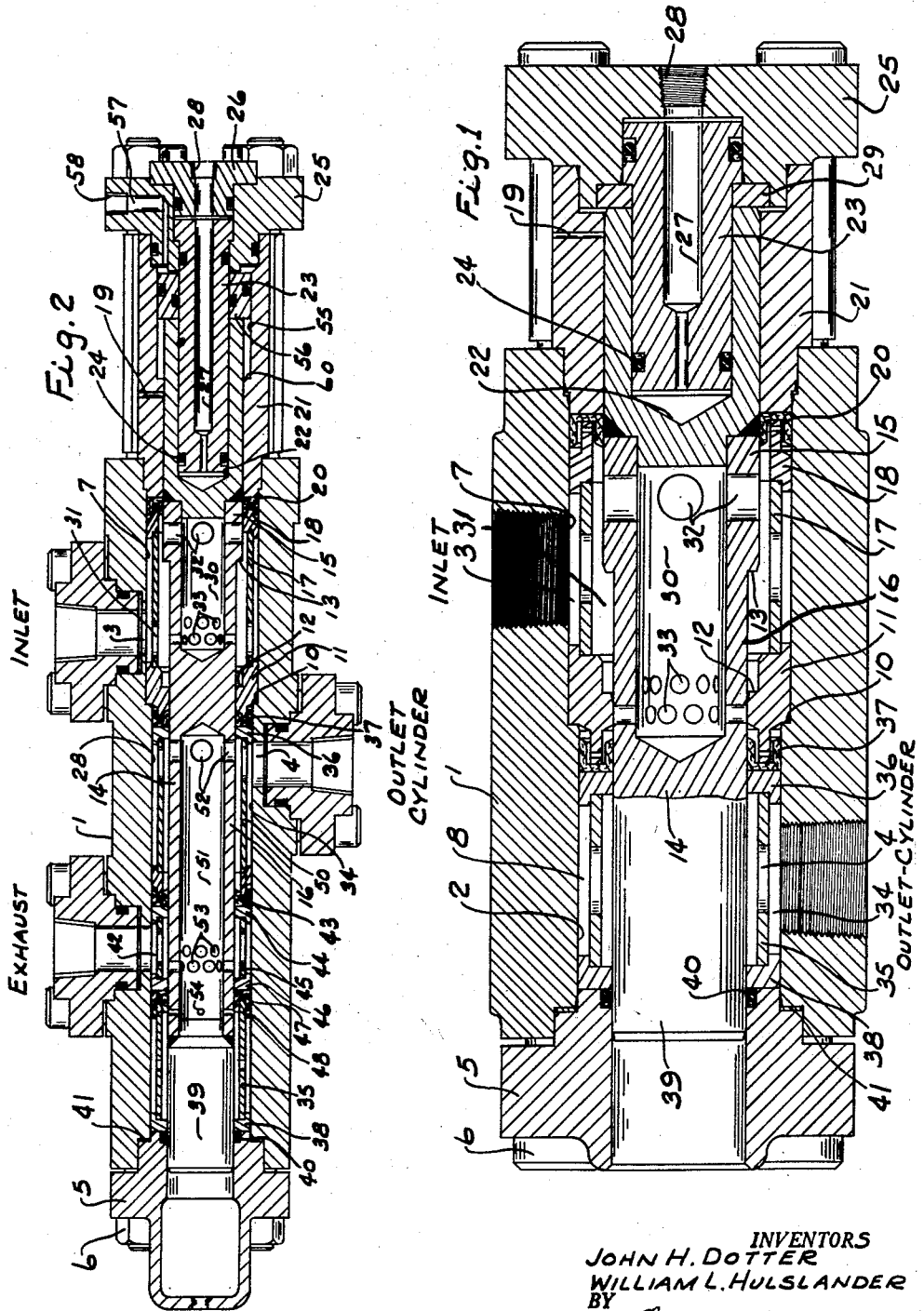
INVENTORS
JOHN H. DOTTER
WILLIAM L. HULSLANDER
BY
*William D. Carothers*
THEIR ATTORNEY

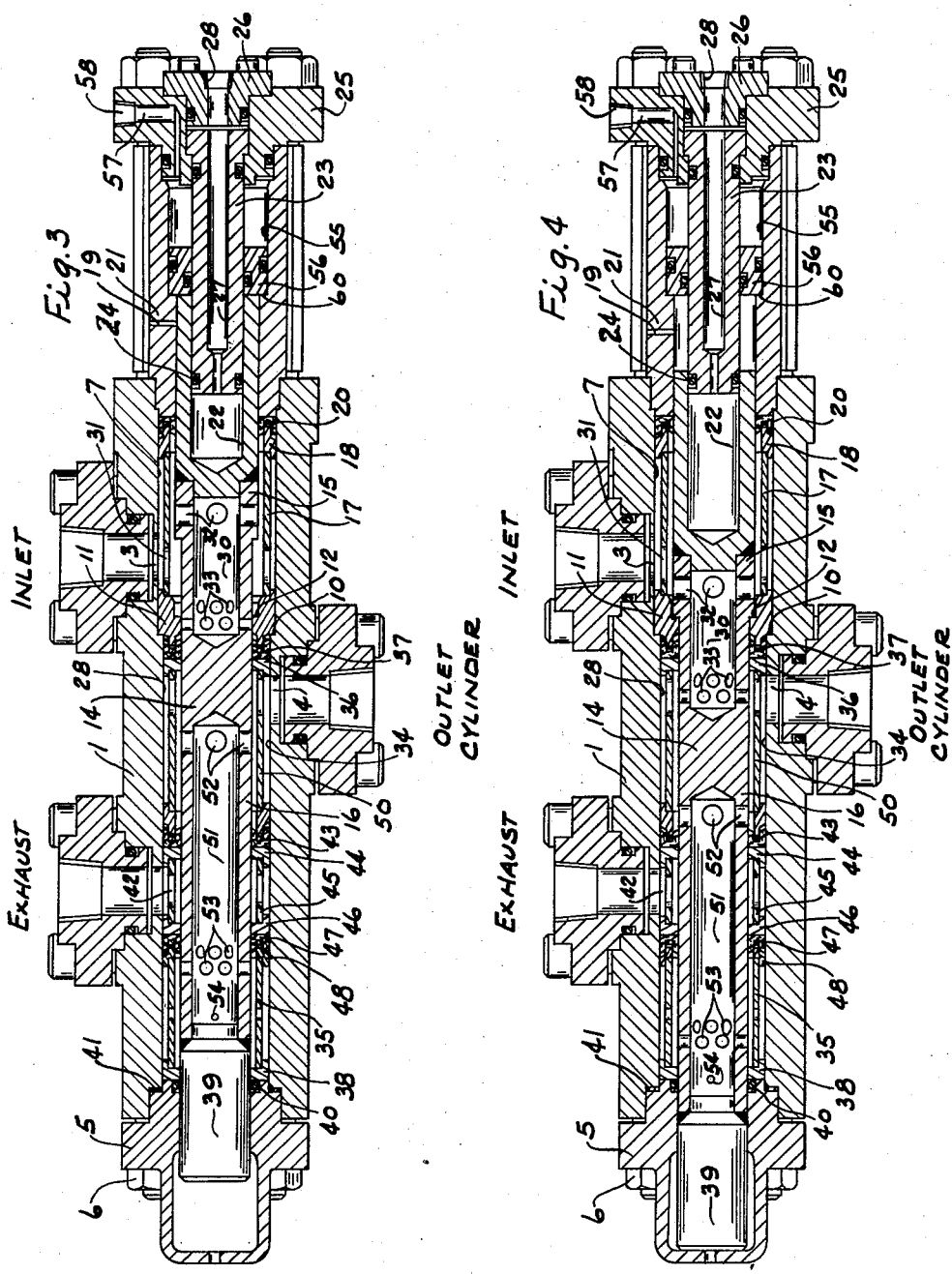

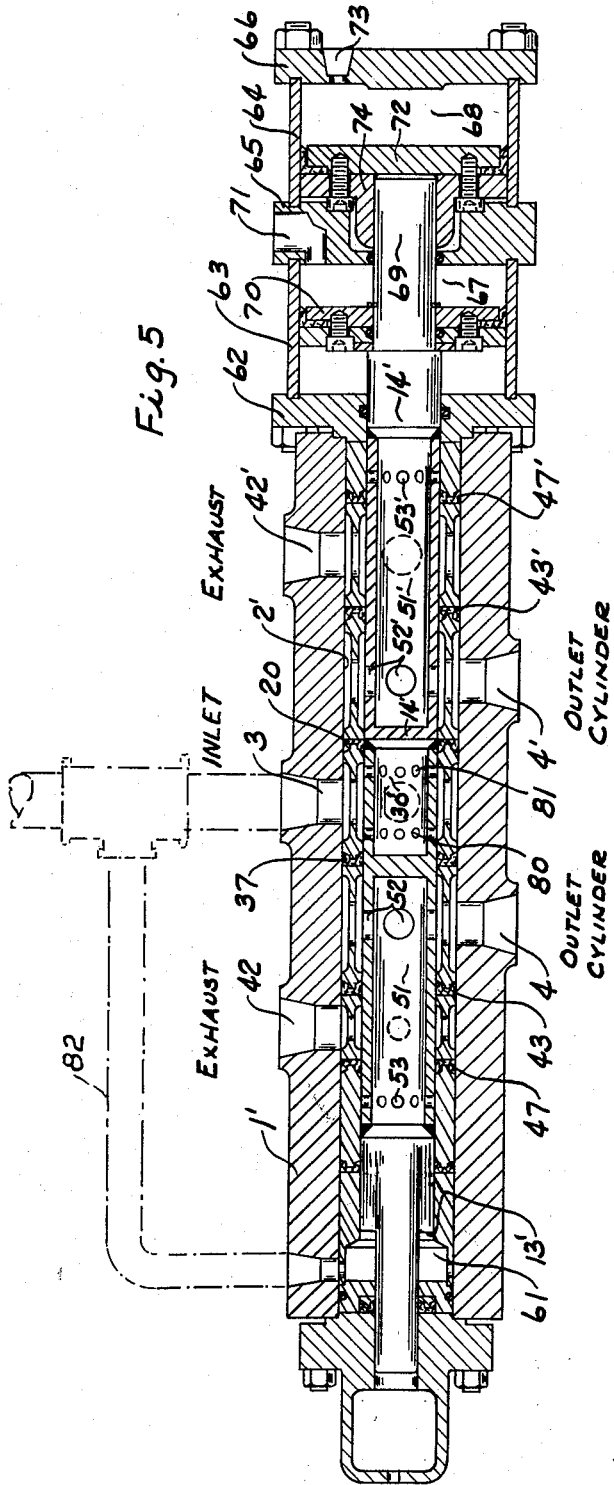

United States Patent Office 2,910,050
Patented Oct. 27, 1959

2,910,050

PISTON TYPE MULTIPORT FLUID PRESSURE VALVE

John H. Dotter, Baltimore, Md., and William L. Hulslander, Osborne, Pa., assignors to Homestead Valve Manufacturing Company, Coraopolis, Pa., a corporation of Pennsylvania Application June 13, 1955, Serial No. 515,058

18 Claims. (Cl. 121—46.5)

This invention relates generally to valves and more particularly to piston type multiport fluid pressure valves.

The principal object of this invention is the provision of a multiport piston type valve riding in U-shaped cup seals pressurized by the line pressure. A three-way valve structure of this character has a port connection for the inlet where pressure is constantly applied, an exhaust port, and a port connection for an operating cylinder which valve controls the supplying and discharging fluid under pressure. This novel valve has only four U-shaped cup seals, and at the cylinder energized position of the valve. All cup seals are pressurized by the line pressure, and at the closed position this pressure subsists on these seals. In a four-way straight plunger valve, the sealing cups on each side of the center inlet are sealed in the same manner.

Another object of this invention is the provision of a differential area piston valve member that employs the line pressure to bias the valve member to return to cylinder exhaust.

Another object is the provision of a novel fluid actuated piston means to operate this piston type valve. This operating piston means is preferably made in two parts for a three and a four-way valve to provide a mid-stop position wherein the valves are completely shut off. These fluid actuated pistons provide for a cushion that prevents slamming of the valve member for the full stroke in either direction. These novel operating piston means may be actuated by air or hydraulic fluid. Hydraulic actuation may be obtained by the line pressure through control valves which further simplifies the fluid system.

Other objects and advantages appear hereinafter in the following description and claims.

The accompanying drawings show for the purpose of exemplification without limiting the invention or claims thereto certain practical embodiments illustrating the principles of this invention wherein:

Fig. 1 is a view in section of a two-way valve comprising this invention.

Fig. 2 is a view in section of a three-way valve open to exhaust.

Fig. 3 is a view similar to Fig. 2 showing the valve closed.

Fig. 4 is a view similar to Fig. 2 showing the valve open to the outlet or cylinder.

Fig. 5 is a view in section of a four-way valve in its closed position.

In Fig. 1 a single shutoff valve is shown. The structure of this valve is similar to the structure of other valves of this application. The valve body 1 is tubular in form and is provided with a valve chamber as indicated at 2. This valve cylinder is provided with an inlet port means 3 and an outlet port means or cylinder port means 4, which is spaced axially from the port 3. The end of the valve body is provided with a cap member 5 which is secured by means of the nut and bolt members 6. However, the cap member is open as indicated.

The valve chamber 2 has a large bore 7 and a small bore 8 forming the shoulder 10 therebetween. The plunger stop ring 11 is seated on the shoulder 10 and is provided with a stop shoulder 12 which may be engaged by the shoulder 13 on the valve member 14. Thus the valve member 14 has a large diameter section 15 and a small diameter section 16 which operate in the large and small bores 7 and 8, respectively.

The plunger stop ring 11 has the intake insert 17 seated thereon. The other end of the insert is provided with the pilot end pedestal 18 which extends into the pilot end U-shaped cup packing 20. The pilot cylinder 21 is seated against the end of the valve body member 1 and has its inner end engaging with the U-shaped cup packing 20. The pilot end of the valve member 14 is provided with a hollow bore 22 which receives the stationary piston 23 which is provided with an O seal ring as indicated at 24. This stationary piston 23 is loosely seated in the cylinder head 25 and is blocked by the stop ring 29, the fluid pressure in 22 holding the piston 23 in place. The stationary piston 23 has a bore 27 therein which has a threaded bore at its outer end at 28 for receiving a control line for the purpose of supplying fluid thereto, which extends into the cylindrical chamber 22 within the valve member and forces it to the left to actuate the same. The pilot cylinder 21 has the bleeder port 19 to discharge any leakage in the pilot cylinder in back of the valve member 14.

The valve member 14 is provided with a passage member 30 which is connected to the chamber 31 open to the inlet 3 by means of the valve port means 32, which are four large holes disposed at 90° to each other. At the other end of the passage 30 a series of small valve port means, as indicated at 33, is provided. Thus the valve port means 32 and 33 are in spaced relation on the valve member. The outlet or cylinder connection 4 opens through the wall of the valve member 1 to the chamber 34 which has seated therein the cylindrical spacer insert 35 that abuts against the spacer and U-cup backup ring 36 to hold the latter for the purpose of supporting the U-shaped cup seal ring 37. The U-shaped cup rings 20 and 37 are open toward each other. However, the latter is of smaller diameter than the former, but they function to seal between the valve member 14 and the bore 7 and 8, respectively. The ring support 38 is held in position by the cap 5 and thus retains the spacer insert in position and also forms a backup for the O ring 40. The O ring 40 is positioned to seal against the wall of the valve member. A ring gasket 41 seals between the head 5 and the valve body 1.

This valve has only two positions, the shutoff position as shown in Fig. 1 and the flow position, which is obtained when the valve member 14 is moved by supplying fluid under pressure into the chamber 22, causing the valve member 14 to move to the left until the shoulder 13 strikes the shoulder 12. At this time the small port members 33 will have passed the U-shaped packing 37 and will be open into the chamber 34 and permit fluid under pressure to flow from the inlet 3 to the outlet or cylinder 4.

Referring to the structure of Figs. 2, 3, and 4, it will be noted that the valve structure is substantially the same with the exception that the valve structure is provided with the additional port, as indicated at 42, which is an exhaust port. This exhaust port is spaced somewhat further from the outlet or cylinder port 4 than the latter is spaced from the inlet port 3 in the valve body 1.

The chamber 34 in the structure of Figs. 2 to 4 is closed by the U-shaped sealing ring 43 which is held between the ring 44, the exhaust insert 45, and the ring 46, which is similar to the ring 38. The ring 46 has another U-shaped packing backed against it, as indicated at 47 and it in turn is provided with the pedestal 48 held by the filler 35. The outlet 4 or cylinder port means is provided with the filler insert 50.

Thus it will be observed that the four U-packing members 20, 37 and 43, 47 which are made of leather are open to the inlet 3 and are backed relative to the exhaust port 32. The reason for this particular arrangement of the port members, together with the structure of the valve, was to permit the fluid pressure in the inlet 3 to pressurize each of these four U-shaped seals when connected as shown in Fig. 3 to the cylinder. This is accomplished by means of the second valve port means, as indicated at 51, which has the large port openings 52 and the smaller port openings 53, together with a bleeder port 54. This passage 51 is closed at its end by the plug member 39.

The structure as shown in Fig. 2 permits the cylinder to exhaust from the chamber 34 through the passageway, the valve port means 52 of the passageway 51, and the valve port means 53 to the exhaust port 42. At this position the inlet passage 3 is merely supplying fluid under line pressure to the two U-seal rings 20 and 37.

In the position as shown in Fig. 3 the inlet is still sealed from the outlet or cylinder and the exhaust is sealed from the outlet or cylinder. However in this condition usually the cylinder may be charged with fluid under pressure, which pressure is effective on the U-shaped seal members 43 and 47 defining the exhaust. Thus in this position all of the U-shaped seals are under pressure, and this pressure is equal to the inlet pressure of the system.

In order to actuate the valve from the position as shown in Fig. 2 to the position as shown in Fig. 3, the pilot cylinder 21 is provided with an enlarged bore 55, which receives the free piston ring 56 that is properly sealed by O-rings relative to the bore and which surrounds and is properly sealed relative to the stationary piston 23. The piston 56 is supplied with fluid under pressure through the passageway 57, the outer end of which is threaded, as indicated at 58, for receiving the control line. When fluid pressure is passed through the passageway 57, it forces the piston 56 to the left from the position as shown in Fig. 2 to the position as shown in Fig. 3, thereby moving the valve member 14 to the left and to the position as indicated in Fig. 3 of the drawing. The piston is stopped by reason of the shoulder 60 which is formed between the enlarged bore 55 and the bore of the pilot cylinder in which the valve member rides.

In view of the fact that inlet pressure is always supplied in the chamber through the inlet 3 into the chamber 31, this pressure is effective against the shoulder 13 to bias the movement of the valve member 14 to the right. However, this area of the shoulder 13 is insufficient to overcome the line pressure against the piston 56, which is usually charged with the same fluid as the inlet pressure 3, and thus the valve member 14 is moved to the left until the piston 56 strikes the shoulder 60, at which time the pressure within the inlet chamber 31 is constantly effective against the shoulder 13 to force the valve member 14 against the piston 56 which is stopped by the shoulder 60. Thus the valve is still in this position until the fluid behind the piston 56 is released, which will permit the line pressure in the chamber 31 to force the valve member 14 to return to the right.

To move the valve member 14 further fluid is supplied through the passageway 27 to the chamber 22, thus causing the valve member 14 to assume further movement to the left in the same manner as described in the structure with reference to Fig. 1. Thus upon the supplying of fluid under pressure to the chamber 22 the valve member 14 is caused to move further to the left until the shoulder 13 strikes the shoulder 12, causing the valve member to stop. There is always sufficient differential area even though the shoulder 13 abuts the shoulder 12 forcing the valve member 14 to the right when either or both of the pistons 23 and 56 in their chambers 55 and 22 are relieved of fluid under pressure. The position where the valve is fully extended to connect fluid under pressure to the outlet 4 or cylinder is illustrated in Fig. 4. This is ordinarily the position assumed by the valve before the same is permitted to return to the shut-off position, as illustrated in Fig. 3. In the shut-off position of Fig. 4, it will be noted that the cylinder is connected with the inlet, and each of the four U-shaped cup packings are fully charged with line pressure for sealing this valve.

In the valve structure as shown in Figs. 2 to 4 one could move the valve member the full way by first energizing the cylinder 22. However, this is not ordinarily permitted in practice and the use of the double stop formed by the ring piston 56 provides a cushion or further retarding means for the valve which prevents its travel for its full length preventing the shoulders from becoming worn by hard hitting valve movement. This is an important feature of this invention.

The structure shown in Fig. 5 is a four-way valve. This valve is provided with the valve body member 1', which is similar in many respects to the structure as shown in Figs. 1 and 2.

The valve body 1' is provided with a bore 2' and has the sealing members as illustrated in conjunction with the structure of Figs. 1 and 2. However, the valve member 14' is somewhat different in structure in that the valve port means or independent passage means 30' is employed to energize or supply fluid to the outlet or cylinder 4 when the valve member 14' is moved to the left or the supply line fluid under pressure to the cylinder outlet 4' if the valve member is moved to the right as shown in Fig. 5. As shown in Fig. 5, each of the cylinders is closed from the exhaust and from the inlet. Since the valve member 14' is of uniform diameter the shoulder 13' is placed on the end of the valve member and the chamber 61 is connected by a branch line 82 with the inlet chamber 3 so as to provide fluid pressure at all times against the shoulder 13'.

In place of employing a hydraulic cylinder structure as illustrated in Figs. 1 to 4 inclusive, the structure of Fig. 5 discloses the use of a pneumatic control system wherein the cylinder head 62 is bolted to the body 1' and it in turn is provided with two cylinder members 63 and 64 with an intervening head 65 and an end head 66, forming the chambers 67 and 68. The stem 69 on the end of the valve member 14' may be provided with a shoulder as illustrated, or it may be provided with a fixedly secured piston member 70. The piston member 70 is energized from fluid under pressure entering through the passageway 71, and the piston member 72 is moved by fluid entering into the passageway 73 into the chamber 68. In order to move the piston 14' to the position as shown in Fig. 5 fluid under pressure is provided in the passage 73 to the chamber 68 for moving the piston 72 the full depth of the chamber 68. Since the stem 69 is slidably bottomed in the seat 74 on the piston 72, the piston 72 will move it to the position as shown in Fig. 5 and will then stop because it engages the head 65.

Further movement to the left is obtained by subjecting the chamber 67 with fluid under pressure through the passage 71, which operates against the piston 70 that in turn forces the valve member 14' further to the left and thus permits the fluid pressure to enter through the passageway 30' from the inlet 3 to the outlet 4 and at the same time applies a pressure seal on each of the U-shaped seals 20, 37, 43 and 47. At this time the valve port means 53' is connected to the exhaust 42' and thus the cylinder 4' is exhausted through the port 52', the passage 51' and port 53' to exhaust.

It is preferred to permit the pilot valve to exhaust first the chamber 67 through the passage 71, which permits the line pressure on the shoulder 13' to move the valve 14' to the right and the stem 69 to again reenter the seat 74 and engage the piston 72. The chamber 68 being filled with fluid under pressure the piston 72 will remain in the position as shown in Fig. 5 until the fluid under pressure is exhausted from the chamber 68 which permits the stem 69 to force the piston 72 to the center head 66, in which position the port 4 would be exhausted to the exhaust 42 and fluid under pressure will be permitted to flow through the passageway 30′ to the cylinder 4′.

The passageway 30′ of the piston 14′ is provided with two sets of ports. However, these ports are both small as indicated at 80 and 81. The reason for using small ports in this particular structure is because these ports have to pass the U-shaped sealing members and it is best to have small ports 33, 53, 53′, 80 and 81 to permit them to equalize the pressure on the U-shaped seal cups when passing over the same. It is better also to provide a small opening so that when equalized pressure is sustained on these cup seals, they will not expand and be caught in the ports as the valve member is moved back and forth across these U-shaped sealing members.

We claim:

1. A fluid pressure valve comprising, a valve body having a valve chamber, said valve body having spaced fluid pressure inlet port means, an outlet and an exhaust port means on each side of said inlet port means, a packing cup in said valve chamber on each side of said exhaust port means and each packing cup open in the direction away from said exhaust port means, each outlet port means intervening said inlet and an exhaust port means, a valve member slidable in sealed relation in said chamber in sealed relation to said packing cups, three independent passages spaced axially from each other in said valve member, spaced ports in said valve member for each passage to connect selected inlet and outlet and exhaust port means.

2. A fluid pressure valve comprising, a valve body havig a valve chamber, spaced inlet and outlet port means in said valve body connected to said chamber, a valve member having a hollow cylindrical end and slidable in said chamber and having valve port means cooperating with said spaced port means at different longitudinal positions, seal means between the valve member and said valve chamber, a differential area on said valve member constantly subjected to fluid pressure from a line to said inlet port means in said valve body to bias the movement of said valve member in one direction a piston, and means for subjecting it to pressure sufficient to move the valve member in the opposite direction against the line pressure, when desired.

3. The structure of claim 2, which also includes a head closing one end of said valve body means, a stationary piston on said head and extending into and sealing with the cylindrical end of said valve member, and a control passage in said stationary piston to admit pressure to move said valve member against said pressure biased action.

4. The structure of claim 2, which also includes a head closing one end of said valve body, a bore in the end of said valve body larger than said valve member, an independently slidable piston in said bore and engaging said valve member to move it in one direction, and a control passage to supply fluid under pressure on said independent piston to move said valve member against its pressure biased action.

5. A fluid pressure valve comprising, a valve body having a valve chamber, spaced port means in said valve body connected to said chamber, a valve member slidable in said chamber and having a hollow cylindrical end and having valve port means cooperating with said body port means at different longitudinal positions, seal means between the valve member and said valve chamber, differential pressure area means associated with said valve member to urge it in one direction, means for supplying line pressure to the said pressure area, a head closing one end of said valve body means forming a cylinder means, piston means in said cylinder, and means for supplying other pressure to the piston sufficient to actuate valve member to move it in the other direction.

6. The structure of claim 5 characterized in that said piston means is in two piston parts each effective to move said valve member, one piston part capable of traveling the full stroke of the valve member and the other piston part capable of traveling only part of the stroke of the valve member.

7. A fluid pressure valve comprising, a valve body having a valve chamber, spaced port means in said valve body connected to said chamber, a valve member having a hollow cylindrical end and slidable in said chamber and having valve port means cooperating with said body port means at different longitudinal positions, seal means between the valve member and said valve chamber, differential pressure area biasing means including a differential area on said valve member and subjected to inlet pressure to urge it in said one direction to the extreme position thereof, piston means connected to said valve member to move the latter when energized in the opposite direction against said pressure biasing means.

8. The structure of claim 7 characterized in that said piston means is in two piston parts, stop means for one piston part to position said valve member at shutoff.

9. The structure of claim 8 characterized in that said valve port means in said valve member is connected to the inlet to pressurize the whole of the valve body at this position.

10. The structure of claim 8 characterized in that said other piston part moves the valve member in said opposite direction to the extreme position thereof.

11. The structure of claim 7, which also includes a bleeder port in said valve body connecting the valve chamber to the exterior of the body adjacent said piston means for discharging any leakage from said piston means.

12. A fluid pressure valve comprising, a valve body having a valve chamber, spaced fluid pressure inlet and outlet port means in said valve body connected to said chamber, ring means in said chamber, a differential diameter valve member slidable in said ring means and having a passage to connect said port means at different longitudinal positions of the valve member, an enlarged diameter bore in said ring to receive the shoulder formed by the differential diameter valve member to entrap fluid and retard the movement of said valve member in one direction, and locking means to secure said ring to said valve body.

13. The structure of claim 12 which also includes a beveled shoulder on said valve member and in said enlarged diameter bore which coact to provide a gauged escape of the fluid entrapped between the shoulder and said ring to slow down the movement of said valve member.

14. A fluid pressure valve comprising a valve body having a valve chamber, spaced fluid pressure inlet and outlet port means in said valve body connected to said chamber, a plurality of pairs of ring spacers in said chamber, a perforated spacer separating each pair of ring spacers, a U-shaped packing cup having its open side faced in the direction of selected of said ring spacers, an annular extension on said selected ring spacers extending into the U-shaped packing cup to engage the bottom thereof, said extension being spaced from the sides of said U-shaped packing cup, a valve member riding in sealed relation with said U-shaped packing cups and having a passage to connect said ports at different longitudinal positions of the valve member, said passages being exposed to said U-shaped packing cups when passing the same, and members at the end of the valve body for holding said pairs of ring supports, spacer members, and U-shaped packing cups in assembled relation within said valve body.

15. A fluid pressure valve comprising a valve body having a valve chamber, spaced port means in said valve body connected to said chamber, a valve member having a hollow cylindrical end slidable in said chamber and having valve port means cooperating with said body port means at different longitudinal positions, seal means between said valve member and said valve chamber, a head closed at one end of said valve body, a socket on the inner face of said head, a stationary piston having a flanged end seated in said socket to extend the piston in the hollow cylindrical end of said valve member and sealed therewith, a passage extending through said head and said stationary piston to within the hollow cylindrical end of said valve member for admitting fluid thereto to actuate said valve, and sealing means between said socket and said stationary piston to permit the latter to float in said socket.

16. The structure of claim 15 characterized in that said passage is provided with an orifice to control the speed of movement of said valve member.

17. A fluid pressure multiport valve comprising, a valve body having a valve chamber, spaced fluid pressure inlet and outlet and exhaust port means in said valve body connected to said chamber, spaced annular packing cups in said chamber, a packing cup on each side and open in the direction of said inlet port means, a packing cup on each side and open in the direction outward of said exhaust port means, said outlet port means intervening said inlet and exhaust port means, a valve member slidable in said chamber in sealed relation with said packing cups, independent passage means spaced from each other in said valve member, port means in said valve member adjacent the ends of each independent passage to interconnect said ports at different relative positions of said valve member, and bleeder port means connecting one of said independent passages in said valve member to bleed the pressure to the area beyond the packing cups at the remote side of said exhaust port means.

18. A valve member comprising a cylindrical structure having an axial bore therein, spaced radial ports at the opposite ends of said bore and connecting said bore to the exterior of the valve member, a plug seated in said bore to close the same and having a cylindrical portion, means to secure said plug and said cylindrical portion to form a unitary valve member, a cylindrical bore in said plug member open at the outer end thereof, and a piston in said bore having relative movement therewith.

References Cited in the file of this patent
UNITED STATES PATENTS

| | | |
|---|---|---|
| 1,342,734 | Barthez | June 8, 1920 |
| 2,132,030 | Hunt | Oct. 4, 1938 |
| 2,157,240 | Keel | May 9, 1939 |
| 2,316,944 | Ernst | Apr. 20, 1943 |
| 2,382,562 | Harvey | Aug. 14, 1945 |
| 2,388,832 | Criley | Nov. 13, 1945 |
| 2,645,450 | Chessman | July 14, 1953 |
| 2,722,946 | Mueller | Nov. 8, 1955 |

FOREIGN PATENTS

| | | |
|---|---|---|
| 11,955 | Great Britain | 1894 |
| 26,345 | Great Britain | Nov. 28, 1907 |